(12) United States Patent
Bopp et al.

(10) Patent No.: US 12,473,092 B2
(45) Date of Patent: Nov. 18, 2025

(54) AIRCRAFT PASSENGER SEAT

(71) Applicant: ZIM AIRCRAFT SEATING GMBH, Immenstaad am Bodensee (DE)

(72) Inventors: Metin Albert Bopp, Tettnang (DE); Alper Altunbas, Uhldingen-Mühlhofen (DE)

(73) Assignee: ZIM AIRCRAFT SEATING GMBH, Immenstaad am Bodensee (DE)

( * ) Notice: Subject to any disclaimer, the term of this patent is extended or adjusted under 35 U.S.C. 154(b) by 0 days.

(21) Appl. No.: 19/085,047

(22) Filed: Mar. 20, 2025

(65) Prior Publication Data

US 2025/0263169 A1    Aug. 21, 2025

Related U.S. Application Data

(63) Continuation of application No. PCT/EP2023/081110, filed on Nov. 8, 2023.

(30) Foreign Application Priority Data

Nov. 8, 2022  (DE) ..................... 10 2022 129 531.1

(51) Int. Cl.
    B64D 11/06  (2006.01)
(52) U.S. Cl.
    CPC ........ B64D 11/0647 (2014.12); B64D 11/064 (2014.12)
(58) Field of Classification Search
    CPC .................................. B64D 11/0647
    USPC ....................................... 297/284.2
    See application file for complete search history.

(56) References Cited

U.S. PATENT DOCUMENTS

| | | | |
|---|---|---|---|
| 3,258,259 A | 6/1966 | Bohlin | |
| 3,273,877 A | 9/1966 | Geller et al. | |
| 4,712,834 A | 12/1987 | Warrick | |
| 7,517,024 B2* | 4/2009 | Cvek | A47C 7/282 297/284.6 |
| 7,614,694 B2 | 11/2009 | Forgatsch et al. | |
| 9,022,474 B2 | 5/2015 | Bullard | |
| 9,650,145 B2* | 5/2017 | Lambert | B64D 11/0639 |

(Continued)

FOREIGN PATENT DOCUMENTS

| | | |
|---|---|---|
| DE | 1 429 266 A | 10/1968 |
| DE | 10 2005 015 143 A1 | 10/2006 |

(Continued)

OTHER PUBLICATIONS

German Search Report (Application No. 10 2022 129 531.1) dated Oct. 31, 2023 (9 pages).

(Continued)

*Primary Examiner* — David R Dunn
*Assistant Examiner* — Tania Abraham
(74) *Attorney, Agent, or Firm* — BURR PATENT LAW, PLLC

(57) ABSTRACT

Aircraft passenger seat, wherein the aircraft passenger seat has a frame, a seating area element and a backrest element. The aircraft passenger seat is distinguished in that the backrest element has a first beam and a second beam, wherein the backrest element has an elastic element, wherein the elastic element extends from the first to the second beam, so that the elastic element forms a support area for a back of a user of the aircraft passenger seat, wherein the elasticity of the elastic element is adjustable.

10 Claims, 3 Drawing Sheets

(56) References Cited

U.S. PATENT DOCUMENTS

| | | | | |
|---|---|---|---|---|
| 10,669,030 B1 * | 6/2020 | Morse | ................ | B64D 11/0647 |
| 2007/0152483 A1 | 7/2007 | Fujita et al. | | |

FOREIGN PATENT DOCUMENTS

| | | |
|---|---|---|
| DE | 20 2011 002 719 U1 | 6/2011 |
| EP | 3 882 151 A1 | 9/2021 |
| GB | 2 035 792 A | 6/1980 |
| GB | 2569289 A | 6/2019 |
| JP | 2003-135197 A | 5/2003 |

OTHER PUBLICATIONS

International Search Report and Written Opinion (Application No. PCT/EP2023/081110) dated Feb. 12, 2024 (17 pages).
International Preliminary Examination Report (with Chapter II Claims) (Application No. PCT/EP2023/081110) dated Aug. 13, 2024 (with English translation) (22 pages).

* cited by examiner

AIRCRAFT PASSENGER SEAT

CROSS REFERENCE TO RELATED APPLICATIONS

This application is a continuation of International Application No. PCT/EP2023/081110 filed Nov. 8, 2023, which designated the United States, and claims the benefit under 35 USC § 119(a)-(d) of German Application No. 10 2022 129 531.1 filed Nov. 8, 2022, the entireties of which are incorporated herein by reference.

FIELD OF THE INVENTION

The present invention relates to an aircraft passenger seat.

BACKGROUND OF THE INVENTION

A large number of embodiments of aircraft passenger seats with one or more seating locations are known for equipping passenger aircraft, in particular, long haul aircraft.

A seating location has a seat bottom and a backrest, wherein, in almost all cases, different seating positions at a seating location of an aircraft passenger seat can be set by changes to the position of the seat bottom, of the backrest and often of both parts. As a result, passengers can change as desired between more active sitting postures in an "upright position", e.g. for eating meals or for takeoff and landing, and more passive sitting postures in a "reclined position", e.g. for relaxing and sleeping.

In particular, various solutions for the movement of the backrest are known. By means of a movement of the backrest, it is possible to specify seat settings which, for example, compromise the freedom of movement, referred to as the "living space", of adjacent aircraft passengers, in particular, in a seat row arranged behind, as little as possible.

Owing to the requirement in air transport to be able to implement seating setups as easily as possible and to eke out the available "living space" of a user as well as possible, the design of conveniently adjustable, comparatively light, comparatively favorable and, at the same time, stable aircraft passenger seats pose a considerable challenge.

SUMMARY OF THE INVENTION

It is the object of the present invention to provide an improved aircraft passenger seat. In particular, to provide an aircraft passenger seat which has an improved comfort function. In particular, to provide an aircraft passenger seat which has improved legroom or improved "living space" for a user sitting behind the aircraft passenger seat.

The present invention starts from an aircraft passenger seat, wherein the aircraft passenger seat has a base, a seating surface element and a backrest element.

Direction references stated below advantageously refer to the sitting direction of the aircraft passenger seat. For example, the sitting direction of the aircraft passenger seat when the aircraft passenger seat is arranged in the aircraft is also the direction of flight of the aircraft.

For example, the base is provided for fastening in the floor region on an aircraft passenger cabin. For example, the base has a seat divider and struts running transversely to the sitting direction, wherein the seat divider is held by the struts. For example, the base has two seat dividers. It is conceivable that the two seat dividers are connected to one another by means of a strut. It is also possible to imagine that the seat dividers are provided for fastening of the aircraft passenger seat in the floor region of the aircraft passenger cabin. The base comprises a surrounding housing, in particular, a rigid surrounding housing, of the backrest element, for example. The surrounding housing is designed as a backrest shell, for example. By means of the backrest shell, an extent of the aircraft passenger seat, for example, e.g. counter to a sitting direction, is defined, in particular, in an invariable manner, in a rearward region.

For example, the seating surface element is designed to provide a seating surface for a user, and the backrest element is designed to provide a support surface for a back of the user of the aircraft passenger seat. For example, the seating surface element is designed as a seat shell or as a seat cushion.

For example, the aircraft passenger seat has a backrest. It is conceivable that the backrest has the backrest element and a backrest shell. For example, the backrest element has a frame.

The heart of the present invention is considered to be that the backrest element has a first beam and a second beam, wherein the backrest element has an elastic element, wherein the elastic element extends from the first to the second beam, such that the elastic element forms a support surface for a back of a user of the aircraft passenger seat, wherein the elasticity of the elastic element is adjustable. It is thereby possible to achieve shifting of the back of a user of the aircraft passenger seat, thereby allowing more relaxed sitting by the user. The legroom of a user sitting in another aircraft passenger seat arranged behind the aircraft passenger seat is thereby maintained unchanged, for example.

The elastic element is understood to mean, for example, that the elastic element has the property of changing its shape when subjected to the action of a force, e.g. by the user, and to return to the original shape when the acting force disappears. For example, the elastic element is deformed by the adjustment of the elastic element. For example, a force of the elastic element which counteracts an action of the user on the elastic element changes owing to deformation of the elastic element. For example, the elastic element counteracts with a force Fe a leaning force of the user, e.g. due to their weight. It is possible to imagine that the force Fe of the elastic element is dependent on a shape condition of the elastic element. For example, a force Fe is lower in the original shape of the elastic element than a force Fe in a deformed state of the elastic element. It is also possible to imagine that the force Fe of the elastic element is adjustable.

It is conceivable that the elasticity of the elastic element is adjustable. For example, this enables a support behavior of the elastic element to be adjusted. For example, the adjustability of the elastic element is achieved by the fact that a shape of the elastic element is adjustable. In the original shape, for example, the elastic element adopts a shape for the "reclined position" of the aircraft passenger seat. It is possible to imagine that the elastic element defines the "upright position" in the adjusted, e.g. deformed, state. For example, passengers can change as desired between a more active sitting posture of the aircraft passenger seat, an "upright position", e.g. for eating meals or for takeoff and landing, and a more passive sitting posture in a "reclined position", e.g. for relaxing and sleeping. For example, the elasticity of an elastic element is greater in the original shape than in the adjusted state. For example, an elastic element is more elastic in the original shape than in the adjusted state.

It is also possible to imagine that the aircraft passenger seat is designed in such a way that a user can lean directly or indirectly on the support surface of the elastic element. It is also conceivable that the backrest element has a cover which covers the elastic element. For example, the cover is arranged between the elastic element and the user.

It is also proposed that the backrest element has a plurality of elastic elements. As a result, the aircraft passenger seat is designed to be ergonomically adaptable to the back of a user.

For example, the elastic elements are all produced from the same material. For example, the elastic elements are of identical design. It is conceivable that the elastic elements are formed from different materials. For example, an elasticity of a first elastic element is different from an elasticity of another, e.g. second, elastic element. It is conceivable that an elasticity of the first and of the second elastic element is different in the original shape of the first and the second elastic element. It is also possible to imagine that one elastic element is different in external shape from another elastic element. For example, one elastic element has a size, e.g. length and/or thickness, which is different from a size of another elastic element.

For example, the aircraft passenger seat has between 2 and 50 or between 2 and 20 elastic elements. It is conceivable that the aircraft passenger seat has between 3 and 15 elastic elements. For example, the aircraft passenger seat has 2, 3, 4, 6, 7, 8, 9, 10, 11 or 5 elastic elements.

It is furthermore proposed that the first and the second beam are connected to one another by a first and a second cross brace, such that the beams and the cross braces form a frame. As a result, there is a comparative improvement in a stability of the aircraft passenger seat.

For example, the first beam, the second beam, the first cross brace and the second cross brace form the frame. It is possible to imagine that the frame is connected to the base. It is conceivable that the frame is designed as a dimensionally stable element. For example, the first beam, the second beam, the first cross brace and/or the second cross brace are designed as a tube or as a rectangular tube. For example, the first beam, the second beam, the first cross brace and/or the second cross brace are connected permanently to one another, e.g. welded or adhesively bonded to one another. For example, the first beam, the second beam, the first cross brace and/or the second cross brace are formed from aluminum, titanium and/or an aluminum alloy.

It is likewise proposed that the elasticity of a first of the plurality of elastic elements is adjustable, wherein the elasticity of a second of the plurality of elastic elements is invariable. This makes it a comparatively simple matter to adjust an ergonomy of the aircraft passenger seat.

For example, the elasticity of a first of the plurality of elastic elements is adjustable in the original shape of the first elastic element. It is conceivable that the original shape of the first elastic element is adjustable. It is possible to imagine that the original shape of the second elastic element is invariable. For example, the elasticity of the second elastic element is variable by a user on the basis of the action of a force. For example, two or more of the plurality of elastic elements are adjustable. It is also possible to imagine that two or more of the plurality of elastic elements are invariable. For example, an original shape of two or more of the plurality of elastic elements is invariable.

For example, 2, 3, 4, 5 or 6 of the plurality of elastic elements are adjustable.

It is furthermore proposed that the elastic element is designed as a stretchable strap or a stretchable band. This enables the aircraft passenger seat to be of comparatively low cost design.

For example, the elastic element is in the form of a stretchable rubber band. It is possible to imagine that the elastic element is produced from fabric and/or plastic. For example, the elastic element comprises a woven fabric, e.g. an elastic woven fabric.

For example, the elastic element has the shape of a band or of a strap. It is conceivable that a length of the elastic element is two, three, four or five times greater than a width of the elastic element. For example, a thickness of the elastic element is in a range of between 0.05 mm and 20 mm. For example, a width of the elastic element is in a range of between 4 mm and 350 mm, e.g. between 5 mm and 300 mm. It is conceivable that the elastic element has a length of between 300 mm and 700 mm. It is also possible to imagine that the elastic element has a length of between 350 mm and 650 mm.

It is also proposed that the position of the backrest element, in particular, the first and the second beam, relative to the base is invariable. As a result, there is a comparative increase in a stability of the aircraft passenger seat. Moreover, this makes it possible to ensure an invariable "living space" for a user sitting behind the aircraft passenger seat. For example, this makes it possible to obtain a backrest in the form of a "fixed shell".

For example, the frame is present and/or connected to the base in a manner which is immovable, rigid and/or fixed in position relative to the base. For example, the first beam, the second beam and/or the first cross brace are present and/or connected to the base in a manner which is immovable, rigid and/or fixed in position relative to the base.

For example, the first beam, the second beam and/or the first cross brace are connected permanently to the base, e.g. welded or adhesively bonded to the base. For example, the first and/or the second beam is formed integrally on the base, e.g. in one piece with the base. For example, the backrest shell fits around the backrest element, at least in some section or sections. It is conceivable that the backrest shell covers a rear region of the backrest element, at least in some section or sections.

It is furthermore proposed that an elastic element is arranged on the backrest element so as to run around the first and the second beam, wherein a first and a second end of the elastic element are movable toward one another and away from one another. This makes it a comparatively simple matter to achieve adjustability of the elastic element.

For example, an elastic element extends along its longitudinal axis from the first beam to the second beam. For example, an elastic element fits around the first beam at a first end of the elastic element. It is conceivable that an elastic element fits around the second beam at a second end of the elastic element. It is conceivable that each elastic element fits around the first and the second beam. It is also possible to imagine that an elastic element extends along its longitudinal axis between the first and the second beam. For example, a length of the elastic element is less than, equal to or greater than a distance from the first beam to the second beam. It is possible to imagine that the first and the second beam define a width of the backrest element and/or a width of the backrest.

For example, the elastic element extends over a majority of its longitudinal extent along a front side of the backrest element and fits around the first and/or second beam with its end, wherein the first and/or the second end of the elastic element extend/extends along a rear side of the backrest element, such that the first and/or the second end of the elastic element are/is spaced apart from the majority of the elastic element by way of the thickness of the beam. For example, the front side of the backrest element forms the side against which a user of the aircraft passenger seat can lean.

For example, a plurality of elastic elements are arranged on the backrest element so as to be positioned side-by-side along a longitudinal axis of the first beam and/or a longitudinal axis of the second beam. For example, a longitudinal extent of an elastic element is aligned transversely to the longitudinal axis of the first beam and/or transversely to the longitudinal axis of the second beam. For example, the width of an elastic element extends along the longitudinal axis of the first beam and/or along the longitudinal axis of the second beam.

It is conceivable that an elastic element is connected at its first end to the first beam and at its second end to the second beam. It is possible to imagine that an elastic element is firmly connected at its first end to the first beam and/or firmly connected at its second end to the second beam. For example, an elastic element which is connected to the first and the second beam is of invariable design. For example, an elastic element is firmly connected at its first end to the first beam and arranged so as to fit at its second end around the second beam.

It is furthermore proposed that there is a tension device, wherein the first and the second end of the elastic element are connected to a tension element of the tension device, wherein an adjusting element of the tension device engages on the tension element, wherein the tension element can be moved in a direction along a longitudinal axis of the first beam or the second beam by the adjusting element, such that adjustment of the elasticity of the elastic element takes place during a movement of the tension element. Comparatively simple adjustability of the elastic element can thereby be achieved. This makes it possible, for example, to adjust a length of the elastic element.

For example, the aircraft passenger seat has a tension device. It is conceivable for the tension device to have a tension element and an adjusting element. For example, a connecting element of the tension device engages by means of its first end on a first end of an elastic element, wherein the connecting element is connected by its second end to the tension element. For example, a further connecting element of the tension device engages by means of its first end on a second end of the elastic element, wherein the further connecting element is connected by its second end to the tension element. It is conceivable for a plurality of elastic elements to be connected to the tension element, e.g. by means of connecting elements.

For example, the tension element is designed as a ring or as an eye. It is also possible to imagine that the tension element is designed as a rod. For example, the tension element is mounted movably on the backrest element. For example, the rod is mounted movably at its ends on the backrest element. It is conceivable for each connecting element to be arranged on the tension element. For example, each connecting element is secured on the tension element.

It is also possible to imagine that there is a deflection element. For example, the deflection element is in the form of a roller. It is conceivable that a connecting element runs over the deflection element and is deflected by the deflection element. For example, the deflection element is arranged, e.g. secured, on the first beam or on the frame. It is also possible to imagine that there is a plurality of deflection elements. For example, there are two deflection elements per elastic element. For example, there are two connecting elements per adjustable elastic element. For example, the deflection element is arranged on the aircraft passenger seat in such a way that a connecting element can exert a force in the direction of the longitudinal extent of the elastic element. It is conceivable that the connecting element can exert a force on the elastic element exclusively in the direction of the longitudinal extent of the elastic element or parallel to the longitudinal extent of the elastic element.

It is likewise proposed that the aircraft passenger seat has a shaft, wherein the adjusting element is connected to the shaft, wherein, during a rotary motion of the shaft, the adjusting element is wound onto or off the shaft, wherein a position of the tension element is changed by the winding process of the adjusting element. Comparatively simple adjustability is thereby achieved. For example, it is thereby possible to couple the adjustment of the backrest element with adjustment of the seating surface element.

For example, the shaft is coupled to the seating surface element, such that a rotary motion of the shaft changes both a property of the seating surface element and a property of the backrest element. For example, the shaft is designed as a winding shaft.

It is conceivable for the adjusting element to be designed as a cable or a wire. For example, the adjusting element is designed as a control cable or as a wire cable. For example, the adjusting element is connected by a first end to the tension element and by a second end to the shaft. For example, the adjusting element is such that the adjusting element can exert a tensile force on the tension element, brought about, for example, by rotation of the shaft. It is possible to imagine that a tension direction of the tensile force of the adjusting element on the tension element is aligned transversely to a longitudinal extent of an elastic element. It is also conceivable that the tension direction of the tensile force of the adjusting element is aligned in the direction of or parallel to the longitudinal extent of the first beam or of the second beam.

An illustrative configuration of the present invention is a seat row comprising an aircraft passenger seat according one of the preceding embodiments.

Another illustrative configuration of the present invention is an aircraft having an aircraft passenger seat according to one of the preceding embodiments or a seat row according one of the preceding embodiments.

BRIEF DESCRIPTION OF THE DRAWINGS

Further features and advantages of the present invention are explained in greater detail by means of schematically shown exemplary embodiments.

DETAILED DESCRIPTION OF THE INVENTION

Figure 1:
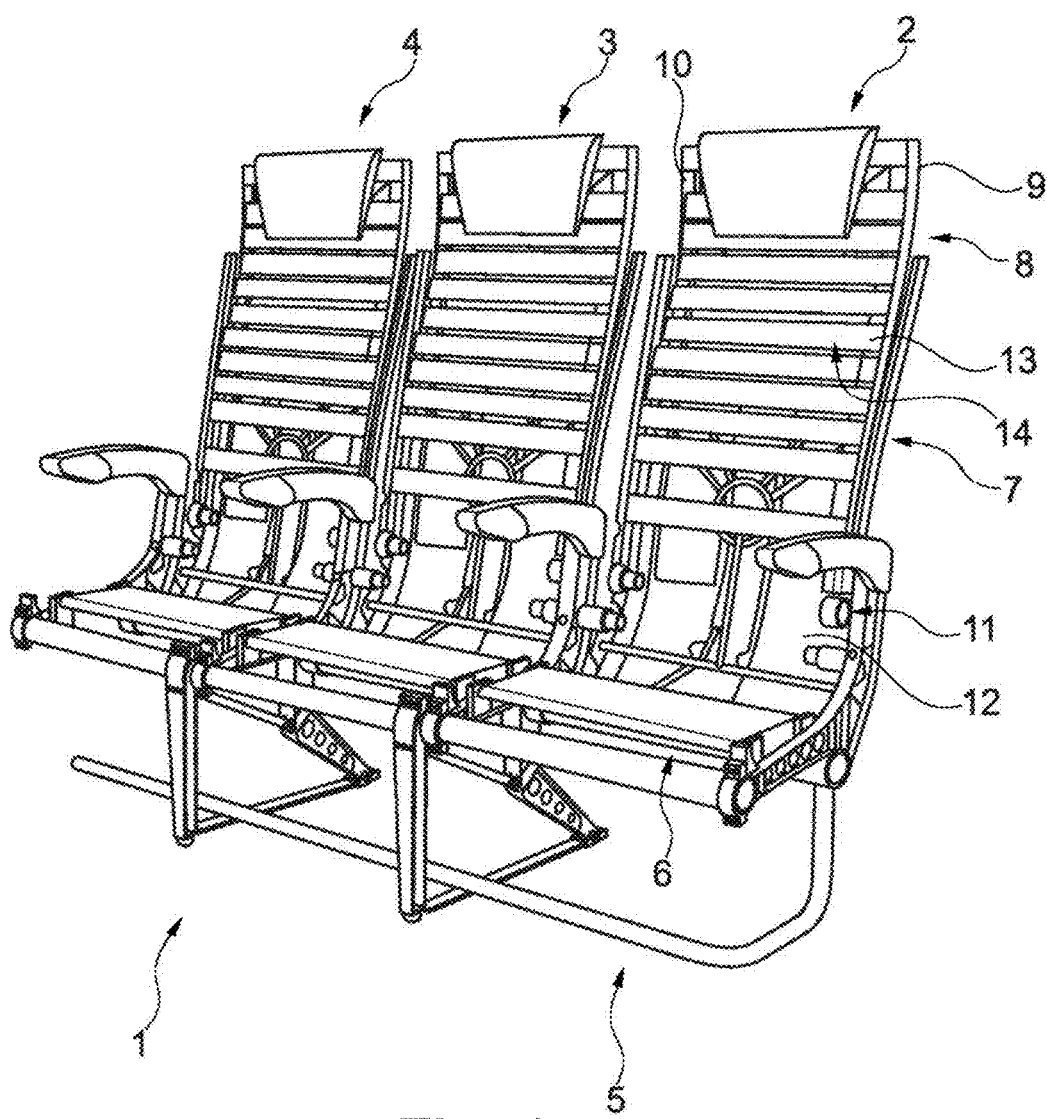
FIG. 1 shows a perspective view at an oblique angle laterally from the front of a seat row comprising aircraft passenger seats.

FIG. 1 shows a seat row 1 comprising aircraft passenger seats 2 to 4. For example, the seat row 1 has a base 5, on which a seating surface element 6 and a backrest element 7 of the aircraft passenger seat 2 are arranged.

For example, the backrest element 7 has a frame 8. For example, the frame 8 has a first beam 9 and a second beam 10. For example, the first beam 9 and the second beam 10 are arranged on the base 5 in such a way as to be movable at a joint 11. For example, there is a backrest shell 12, which delimits the backrest element 7 on a rearward side of the aircraft passenger seat 2.

The backrest element 7 has an elastic element in the form of a band 13. It is conceivable for the backrest element 7 to have a plurality of elastic elements 13. For example, the band 13 has a support surface 14, against which the back of a user of the aircraft passenger seat 2 can rest.

Figure 3:
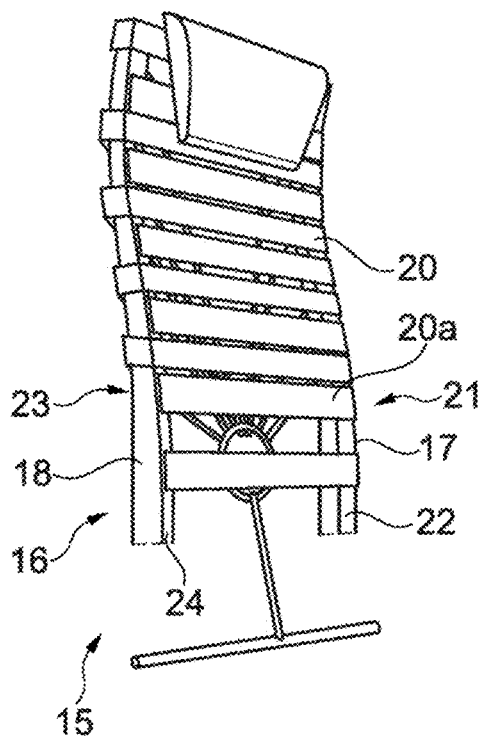
FIG. 3 shows the backrest element according to FIG. 2 in another perspective view at an oblique angle laterally from the front.
Figure 2:
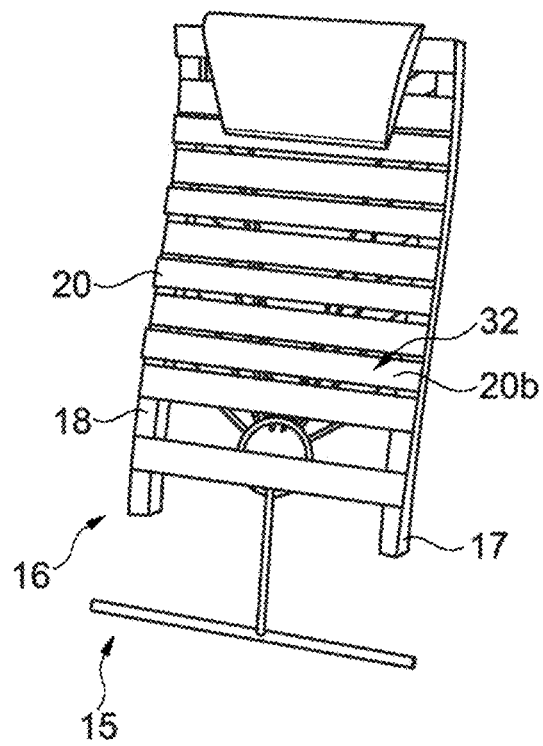
FIG. 2 shows a backrest element of an aircraft passenger seat in a perspective view at an oblique angle laterally from the front.
Figure 4:
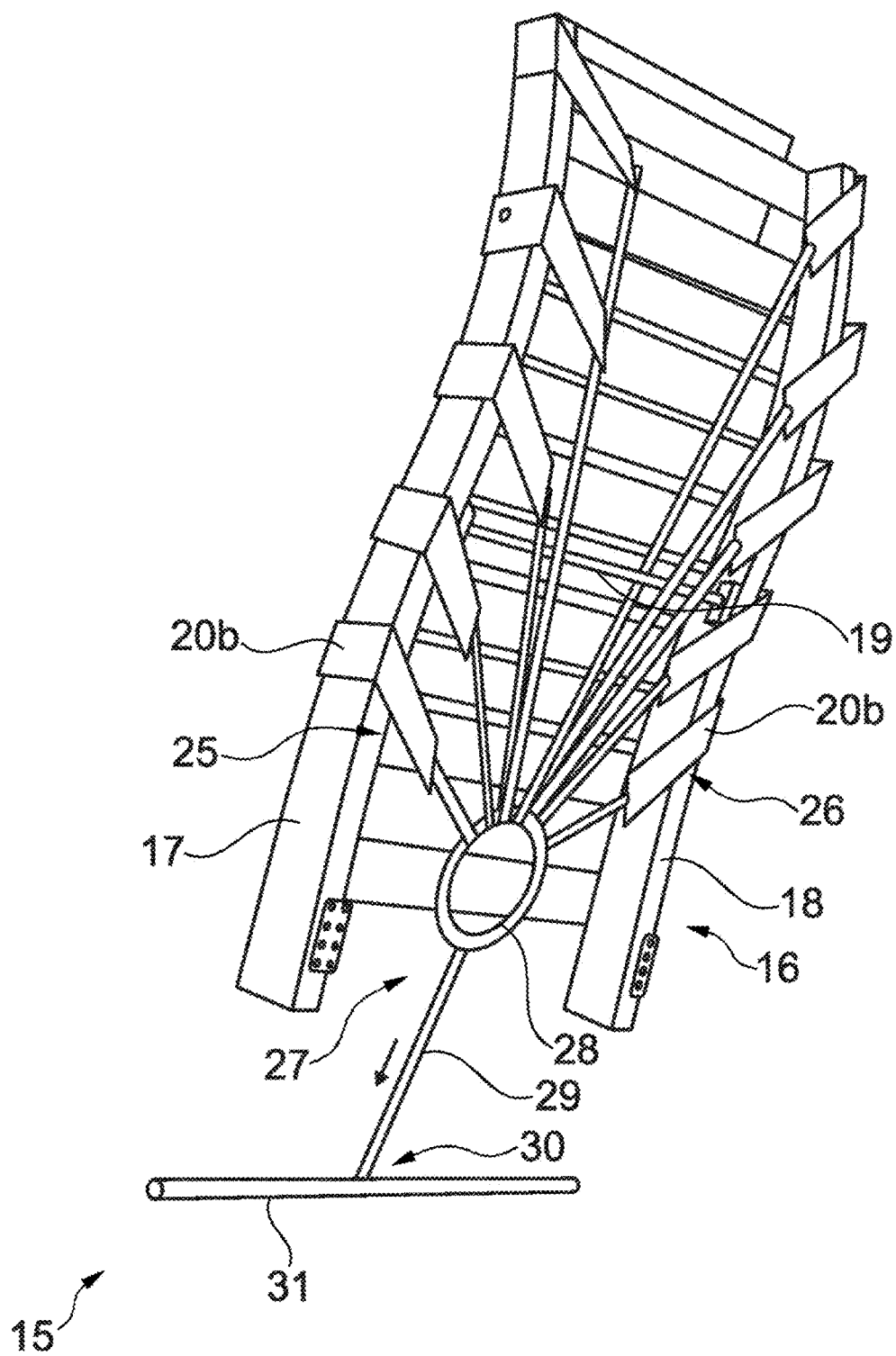
FIG. 4 shows a backrest element according to FIG. 2 in a perspective view at an oblique angle laterally from the rear.

Another backrest element 15 is shown in FIGS. 2 to 4. For example, the backrest element 15 has a frame 16. For example, the frame 16 has a first and a second beam 17, 18. It is conceivable for the first and the second beam 17, 18 to be connected by means of a cross brace 19.

For example, the backrest element 15 has a plurality of elastic elements in the form of bands 20. It is conceivable for a first band 20a to be secured by means of a first end 21 on a front side 22 of the first beam 17 and by means of a second end 23 on a front side 24 of the second beam 18. It is furthermore possible to imagine that a first end 25 of a second band 20b surrounds the first beam 17 and a second end 26 thereof surrounds the second beam 18.

For example, the backrest element 15 has a tension device 27. It is conceivable for the tension device 27 to have a tension element 28 and an adjusting element 29. It is conceivable for the tension element 28 to be designed as a ring. For example, the adjusting element 29 is in the form of a control cable. It is likewise possible to imagine that the adjusting element 29 is connected at one end 30 to a shaft 31. For example, the adjusting element 29 can be wound onto and off the shaft 31.

For example, the first and the second end 25, 26 of the second band 20b are connected to the tension element 28. It is conceivable for a plurality of elastic elements to be connected to the tension element 28. As a result, it is possible to adjust an elasticity of the elastic element in the region of the support surface 32 by a movement of the tension element 28. For example, the tension element 28 is moved downward by winding the adjusting element 29 onto the shaft 31 (see FIG. 4), as a result of which a tensile force is exerted on the ends 25, 26 of the second band 20b.

LIST OF REFERENCE SIGNS 1 seat row
2 aircraft passenger seat
3 aircraft passenger seat
4 aircraft passenger seat
5 base
6 seating surface element
7 backrest element
8 frame
9 beam
10 beam
11 joint
12 backrest shell
13 band
14 support surface
15 backrest element
16 frame
17 beam
18 beam
19 cross brace
20 band
20a band
20b band
21 end
22 front side
23 end
24 front side
25 end
26 end
27 tension device
28 tension element
29 adjusting element
30 end
31 shaft
32 support surface

The invention claimed is:

1. An aircraft passenger seat comprising a base, a seating surface element and a backrest element, wherein the backrest element has a first beam and a second beam, wherein the backrest element has an elastic element, wherein the elastic element extends from the first to the second beam, such that the elastic element forms a support surface for a back of a user of the aircraft passenger seat, wherein the elasticity of the elastic element is adjustable, wherein the elastic element is designed as a stretchable strap or a stretchable band, wherein the elastic element is arranged on the backrest element so as to run around the first and the second beam, wherein a first and a second end of the elastic element are movable toward one another and away from one another, wherein there is a tension device, wherein the first and the second end of the elastic element are connected to a tension element of the tension device, wherein an adjusting element of the tension device engages on the tension element, wherein the tension element can be moved in a direction along a longitudinal axis of the first or the second beam by the adjusting element, such that adjustment of the elasticity of the elastic element takes place during a movement of the tension element, and wherein the elasticity of a first of the plurality of elastic elements is adjustable, wherein the elasticity of a second of the plurality of elastic elements is invariable.

2. The aircraft passenger seat as claimed in claim 1, wherein the backrest element has a plurality of elastic elements.

3. The aircraft passenger seat as claimed in claim 1, wherein the first and the second beam are connected to one another by a first and a second cross brace, such that the beams and the cross braces form a frame.

4. The aircraft passenger seat as claimed in claim 1, wherein the position of the backrest element relative to the base is invariable.

5. The aircraft passenger seat as claimed in claim 1, wherein the tension element is designed as a ring, as an eye or as a rod.

6. The aircraft passenger seat as claimed in claim 1, wherein the adjusting element is designed as a cable or as a wire.

7. The aircraft passenger seat as claimed in claim 1, wherein the aircraft passenger seat has a shaft, wherein the adjusting element is connected to the shaft, wherein, during a rotary motion of the shaft, the adjusting element is wound onto or off the shaft, wherein a position of the tension element is changed by the winding process of the adjusting element.

8. A seat row comprising an aircraft passenger seat as claimed in claim 1.

9. An aircraft having a seat row as claimed in claim 8.

10. An aircraft having an aircraft passenger seat as claimed in claim 1.

\* \* \* \* \*